Nov. 19, 1963 R. GOLDWATER 3,111,262

CONVERSION AND INFORMATION INSERTING APPARATUS

Filed May 2, 1961 6 Sheets-Sheet 1

INVENTOR.
Robert Goldwater

BY

Attorneys

CONVERSION AND INFORMATION INSERTING APPARATUS

Filed May 2, 1961

6 Sheets-Sheet 2

INVENTOR.
Robert Goldwater
BY Fisher and Swain (signature)
Attorneys

CONVERSION AND INFORMATION INSERTING APPARATUS

Filed May 2, 1961 6 Sheets-Sheet 3

INVENTOR.
Robert Goldwater
BY Fleh & Swain
Attorneys

INVENTOR.
Robert Goldwater
BY [signature]
Attorneys

INVENTOR.
Robert Goldwater
BY
Flehr and Swain
Attorneys

INVENTOR.
Robert Goldwater
BY Flehr and Swain
Attorneys

United States Patent Office 3,111,262

Patented Nov. 19, 1963

3,111,262
CONVERSION AND INFORMATION INSERTING APPARATUS

Robert Goldwater, Oakland, Calif., assignor to Safeway Stores, Incorporated, Oakland, Calif., a corporation of Maryland Filed May 2, 1961, Ser. No. 107,218
17 Claims. (Cl. 234—17)

This invention relates to a conversion and information inserting apparatus and more particularly to apparatus for converting information on punched cards into a packed tape and which at the same time inserts information onto the tape associated with the holes in the cards in accordance with the columnar position of the holes in the cards and which also at the same time inserts information on the packed tape which places all of the information on the packed tape in a tubular form so that it can be printed out on a conventional teletype printer.

Although card-to-tape converters have heretofore been available, such converters have not made it possible to insert information on the tape associated with the columnar position of the holes in the cards. In addition, such converters have not inserted information on the tape so as to place the information on the tape in a tabular form so that it can be printed directly on a conventional teletype printer. Heretofore, grid selection lists have been provided for this purpose. However, it has been found that it is difficult to fill an order from a grid selection list in that it is difficult to read and very easy to make mistakes. There is, therefore, a need for a conversion and information inserting apparatus.

In general, it is an object of the present invention to provide a conversion and information inserting apparatus which is relatively inexpensive.

Another object of the invention is to provide a conversion and information inserting apparatus of the above character which can be utilized for converting the information on cards into information on a tape.

Another object of the invention is to provide a conversion and information inserting apparatus of the above character which can be utilized for producing a packed tape.

Another object of the invention is to provide a conversion and information inserting apparatus of the above character in which information is placed on the tape so that the information can be typed out in a tabular form with conventional teletype equipment.

Another object of the invention is to provide a conversion and information inserting apparatus of the above character which will automatically cause starting of a new page when the page has been filled with items or when the items for a particular page have been completed.

Another object of the invention is to provide a conversion and information inserting apparatus of the above character in which scan steppers and count steppers have been utilized.

Another object of the invention is to provide a conversion and information inserting apparatus of the above character in which means is provided for automatically stopping operation of the apparatus in the event the scanning steppers and the counting steppers get out of step with each other.

Additional objects and features of the invention will appear from the following description in which the preferred embodiment is set forth in conjunction with the accompanying drawings.

Referring to the drawings.

Figure 1:
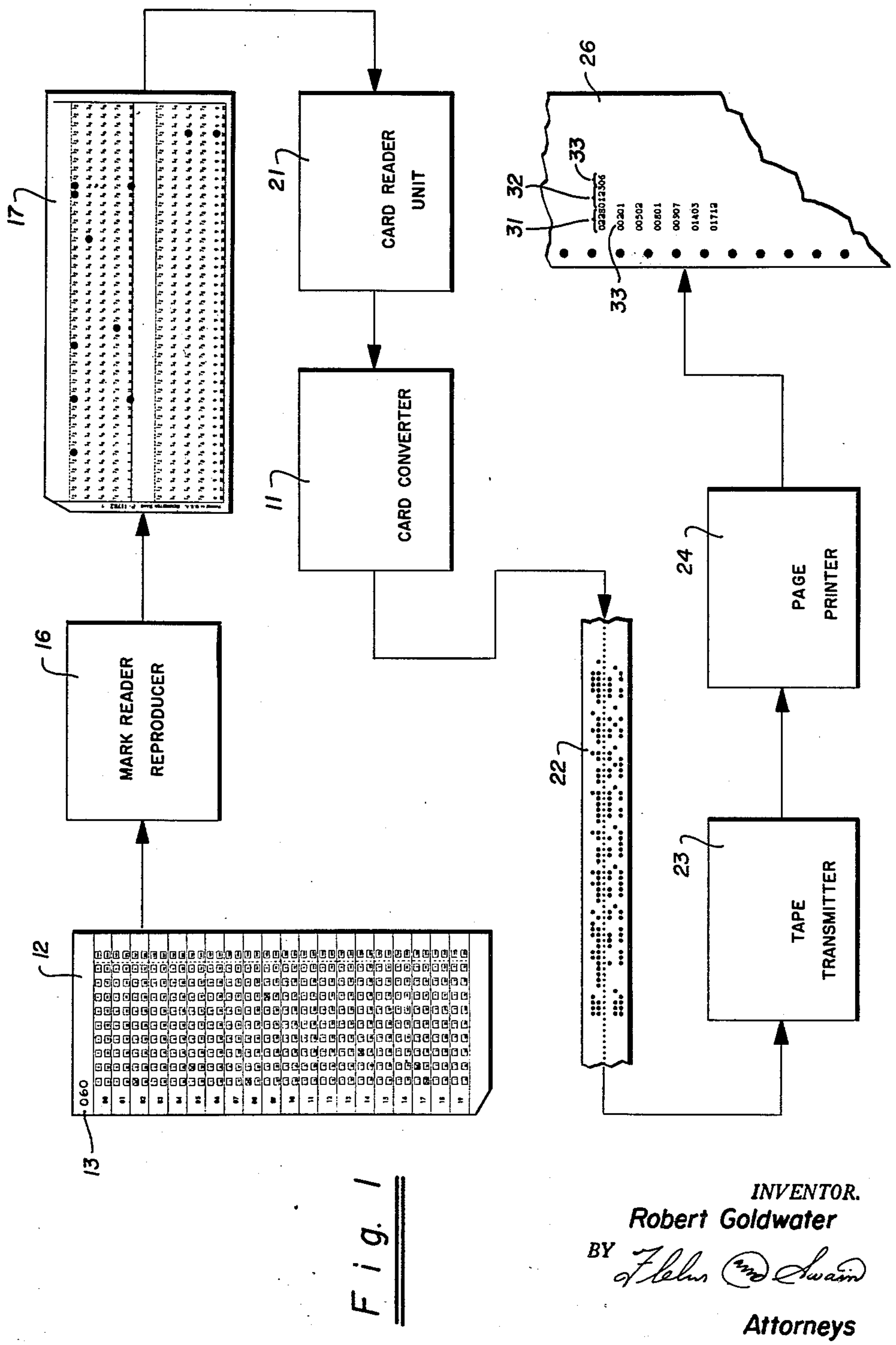
FIGURE 1 is a flow chart showing a system utilizing my conversion and information inserting apparatus for converting mark-sensed cards into a typewritten order.

In FIGURE 1, my conversion and information inserting apparatus is identified as a "Tabutape" card converter 11. The use of my conversion and information inserting apparatus 11 in a particular application is shown in FIGURE 1. In FIGURE 1, there is disclosed a system in which cards 12 are used which are marked in a store as described in my copending application Serial No. 92,223, filed February 28, 1961, and entitled "Order Alignment Board." The cards as described in that application carry a commodity group number 13 at the top of the card such as the number 060 shown in FIGURE 1 which indicates a particular commodity group as, for example, the six thousand commodity group. This commodity group corresponds to the commodity group on an order guide page as set forth in my above copending application. The card 12 is marked in predetermined columns in accordance with the quantities desired and in accordance with the vertical listing of the commodities on the order guide page as also disclosed in my above copending application. Thus, as shown in FIGURE 1, the card 12 has been marked for a quantity of one for item 02; a quantity of two for item 05; a quantity of one for item 08; and so forth.

Cards so marked in my order alignment board are then processd in suitable mark sensing apparatus 16 such as a Remington Rand Mark Reading Reproducer type 5320 to produce punched cards 17 of a suitable type such as a Remington Rand punchd card P–11782 and containing the same information as on the mark sensed cards.

In punching the information into the punch card 17, columns 1 and 2 of the card have been assigned code number 00; columns 3 and 4, code number 01; and so forth. The actual numerical quantity desired which is determined from the marked card 12 is inserted into the punch card 17 in a code which is well known to those skilled in the art as the "Remington Rand Code." Thus, in the marked card 12, the first item marked was the quantity one for the item represented by code 02. Therefore, into column 6 of the punched card 17, the quantity one is punched in the card. For item 05 on the marked card, the quantity of two is punched in column 12 of the punch card 17, and so forth.

The card number for the marked-sensed card, that is, the number 060, is punched into columns 86, 87 and 88 of the punch card 17. Thus, as shown in FIGURE 1, the first zero has been punched in column 86 which is represented by no punch, and the number six has been punched into column 87 which is represented by punches in the 5 and 9 positions. The last zero is represented by no punch in column 88.

The cards after they are punched are placed in a suitable punch card reader such as the Remington Rand type 3906 card reader unit 21 which operates in conjunction with the Tabutape card converter 11 to produce the packed tape 22. As hereinafter described, the delivery date and the store number for the particular batch of cards being processed is set up on selector switches on the Tabutape card converter 11. The packed tape 22 is then fed into suitable tape reading means such as a type 14ATR Teletype tape transmitter 23 which controls suitable page printing means such as a type 28RO Teletype page printer 24 which produces typewritten pages 26. Teletypewriter pages, as is well known to those skilled in the art, are each comprised of approximately 56 single spaced lines or 28 double spaced lines.

The Tabutape card converter 11 is arranged so that the date, the store number, and the card number will appear at the top of each page. For example, as shown in FIGURE 1, the date appears at 31, the store number at 32, and the card number at 33. Thus, there is indicated on each page the store placing the order, the date on which the order is to be shipped, and the commodity code group.

When the Tabutape card converter 11 is placed in operation, it first causes to be punched into the tape 22, the date, the store number and the commodity code group for the first card. The card columns are then scanned in sequence until one or more holes in a card column are found representing a quantity. As soon as the hole or holes are found, the code number associated with the columnar position of the hole is punched into the tape. Thereafter, the quantity of the commodity is punched into the tape.

As soon as this is completed, the card columns are again scanned in sequence until another hole is found, after which the code number associated with the column and the quantity is punched into the tape.

Thus, it can be seen that the Tabutape card converter 11, in addition to punching the date, store number and commodity code group into the tape, also punches into the tape the code number associated with each quantity punched into the card. Additional information is also placed into the tape by the Tabutape card converter 11 so that when the tape 22 is run through the tape transmitter 23 and the page printer 24, the information is typed out in a tabular form. For that reason, line feeds and carriage returns are punched into the tape at appropriate intervals. As soon as 28 items for one commodity group have been placed on a page, another page will be started and the date, store number and commodity group are again typed on the top of the next page.

If there are insufficient items to fill a page for one commodity group and another commodity group is started, information is placed on the tape 22 by the Tabutape card converter 11 so that a new page is started in the page printer and the date, store number and commodity group are typed at the top of the page.

It can be seen from the foregoing that the system shown in FIGURE 1 has many advantages. For example, the marked cards 12 can be produced in the various stores in a chain of stores. The cards after they have been marked can be delivered manually to a distribution center in which punched cards are produced by feeding the cards through the mark reader reproducer 16 and through the card reader unit 21 and the Tabutape card converter 11 to produce a packed punched tape 22. Thereafter, the punched paper tape can be run through the tape transmitter 23 also in the distribution center and transmitted electrically, if desired, in a manner well known to those skilled in the art to a page printer at a remote location as, for example, at the warehouse containing the commodity group being ordered. Printed copies of the order are produced in the warehouse in the desired tabular form making it possible to readily fill the order in the warehouse. Thus, it can be seen that it is only necessary to have one Tabutape card converter 11, one card reader unit 21, one mark reader producer 16, and one tape transmitter 23 at one distribution center for a plurality of stores and a plurality of warehouses. My Tabutape card converter 11 makes it possible to readily insert information into a punched tape and to produce a packed punched tape so that the transmission time required is reduced to a minimum without the aid of an expensive computer.

Figures 2, 3:
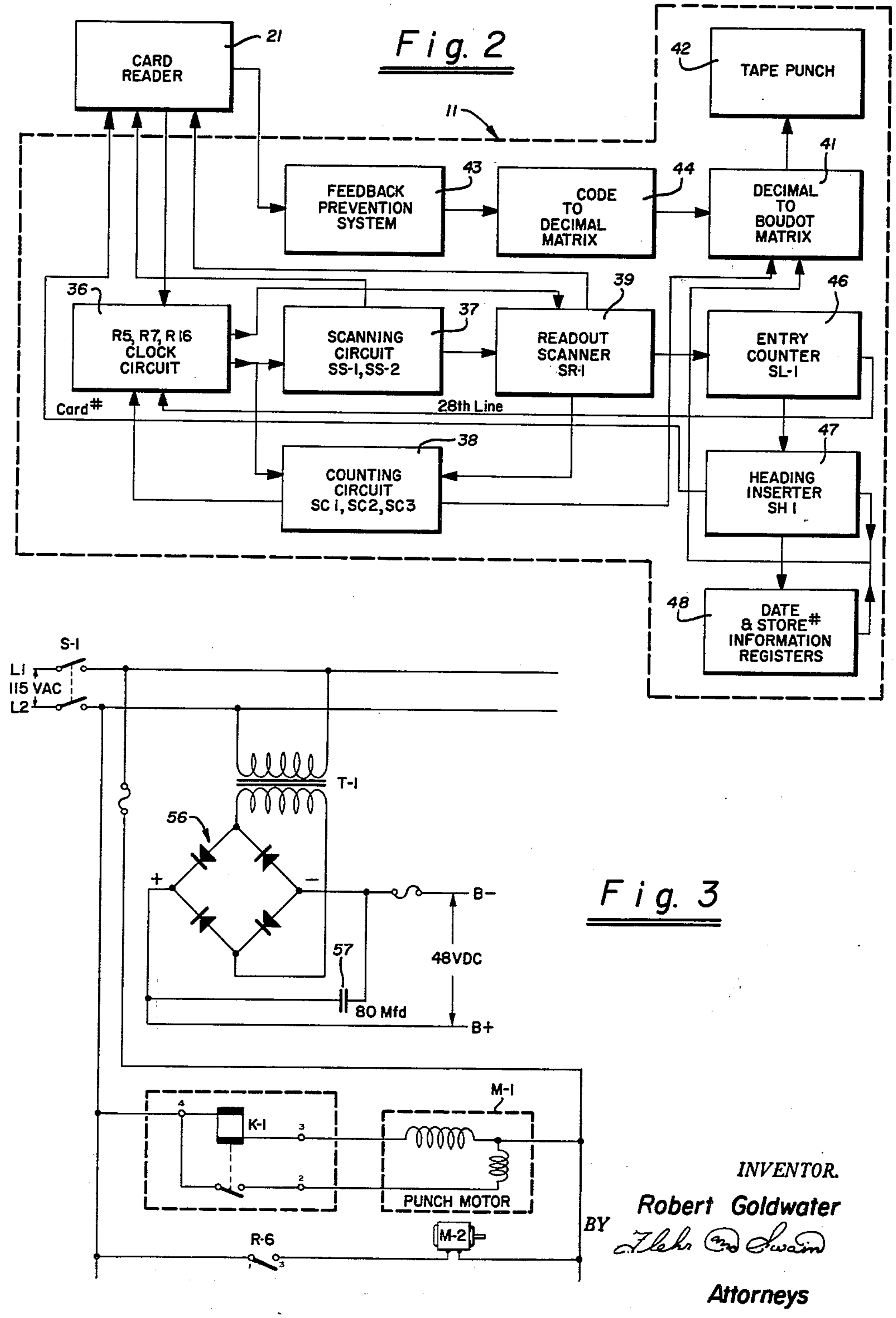
FIGURE 2 is a block diagram of my conversion and information inserting apparatus.
FIGURE 3 is a portion of a circuit diagram for my conversion and information inserting apparatus showing the power supply and the punch motor.

A block diagram of my conversion and information inserting apparatus and also called my "Tabutape" card converter is shown in FIGURE 2. It consists of a clock circuit 36 wihch operates and controls other portions of the apparatus comprising my conversion and information inserting apparatus. The clock circuit operates the scanning circuit 37 which is connected to the card reader 21. The scanning circuit searches the columns of the card in sequential order in looking for holes in the card in the card reader 21 by chucking weather contacts in the card reader 21 associated with the holes are open or closed. When a hole is found, the clock circuit is stopped.

The clock circuit 36 also operates a counting circuit 38 which operates at the same time and in unison with the scanning circuit. When a hole is found, a read-out scanner 39 is operated. The read-out scanner 39 determines the card column position of the hole from the counting circuit 38 and causes this information to be supplied to the decimal to Baudot code matrix 41 which, in turn, supplies it to the tape punch 42. The tape punch 42 punches into the tape the code number associated with the card column. The tape punch can be of any suitable type such as that manufactured by Commerical Controls. The read-out scanner 39 then causes the quantity represented by the holes to be read out. This quantity information is ascertained by determining which contacts in the card reader 21 associated with the holdes in the cards are open or closed and then supplying this information through a feedback prevention system 43 to a matrix 44 which converts the information in Remington Rand Code supplied from the card reader to decimal form. This information in decimal form is supplied to a decimal to Baudot code matrix 41 which supplies the same information in Baudot form to the punch 42. The punch 42 then punches the quantity information into the tape so that when printed out it will be in line with the commodity code number as shown on the page 26 in FIGURE 1.

The read-out scanner 39 is connected to an entry counter 46 which is advanced one position every time that the read-out scanner 39 operates. The entry counter is provided for the purpose of determining when a page has been filled so that a new page will be advanced into the page printer 24. The entry counter 46 is arranged in such a manner so that after the 28th operation of the read-out scanner, the clock circuit 36 is stopped and a heading inserter 47 is operated. The heading inserter 47 reads out the date and store information from date and store information registers 48 and also reads out the card number from the card reader 21 and supplies it to the decimal to Baudot code matrix 41. The decimal to Baudot code matrix 41 supplies this information to the tape punch 42 so that it is punched into the tape to provide the information in a single line on a typed page as shown on page 26 in FIGURE 1. The appropriate line feeds, carriage returns and the like are also punched into the tape as hereinafter described. Means is also provided for starting a new page when all of the commodity code groups have been completed as hereinafter described.

With the foregoing explanation of the system in which my conversion and information inserting apparatus is utilized and a brief review of a block diagram of my conversion and information inserting apparatus, a more detailed explanation of the circuitry utilized may now be undertaken.

The power supply for my apparatus is shown in FIGURE 3 and consists of conductors L1 and L2 which are connected to a suitable source of power such as 115 volts 60 cycle A.-C. A main power switch S1 is provided for connecting and disconnecting the power from the apparatus. The lines L1 and L2 are connected across a motor M1 through a starting relay K1. The motor M1 is the punch motor which is utilized for operating the punches in the Commercial Controls tape punch 42 hereinbefore described. The lines L1 and L2 are also connected across a motor M2 which is the rewind reel motor for the Commercial Controls tape punch 42 through contacts 1 and 3 of relay R6. The lines L1 and L2 are also connected across the primary of a transformer T1 which serves to reduce the voltage to a suitable value such as from 120 to 60 volts. The secondary of the transformer T1 is connected across a full wave bridge type rectifier 56 which has two positive and negative terminals to provide a suitable voltage such as 48 volts D.-C. A capacitor 57 is provided for filtering the output from the rectifier 56.

The remainder of the circuitry utilized in my conversion and information inserting apparatus includes a plurality of relays which are set forth below and identified by their particular function.

Relays:
- R1—starts item or SR1 readout
- R3—transfers scanning from SS1 to SS2
- R4A and R4B—advise circuit when one step past 39
- R5—clock relay in clock circuit
- R6—starts and stops tape rewind reel motor
- R7—provides pull in delay for relay R5 in clock circuit
- R8—starts and stops clock circuit
- R9—continues cycle after heading readout
- R10A and R10B—advise circuit when 28th line has been entered
- R11—starts heading readout
- R12—provides delay before energizing relay R8
- R13—advises when on 10th card or in 900 commodity group of a warehouse
- R14A and R14B—advises when count is 939+1 and end of warehouse order or section of order
- R15—operates card trip solenoid
- R16—provides pull in delay and fast drop out in clock circuit
- R17—prevents readout while SL1 is homing
- R18—prevents repeat entry of last item on page as first item on next page
- RU1, RU3, RU5, RU7, RU9A, RU9B, RU9C—upper order relays for Remington Rand code to decimal matrix
- RL1, RL3, RL5, RL7, RL9A, RL9B, RL9C—lower order relays for Remington Rand code to decimal matrix
- LPC—clutch solenoid for tape punch 41
- LP1, LP2, LP3, LP4, LP5—punch magnets for tape punch 41
- AR—anti-repeat relay Each of the above relays is provided with a plurality of contacts as hereinafter described. The circuitry also includes a plurality of stepping switches which are identified below with their respective functions.

Figure 6:
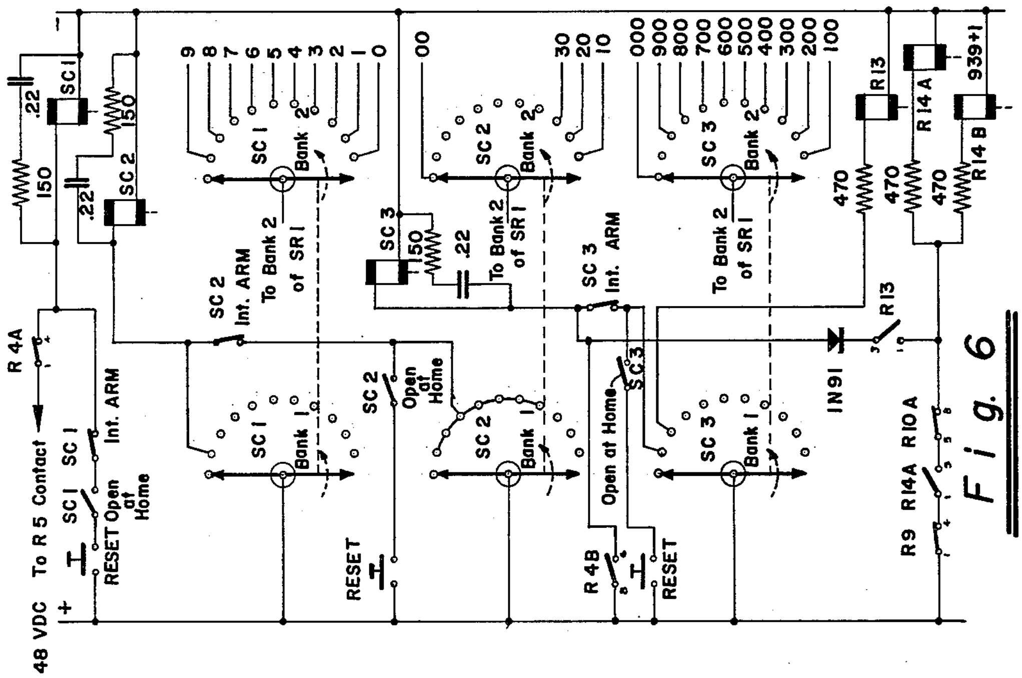
FIGURE 6 is another portion of the circuit diagram of my apparatus showing the count steppers and the circuitry connected thereto.
Figure 7:
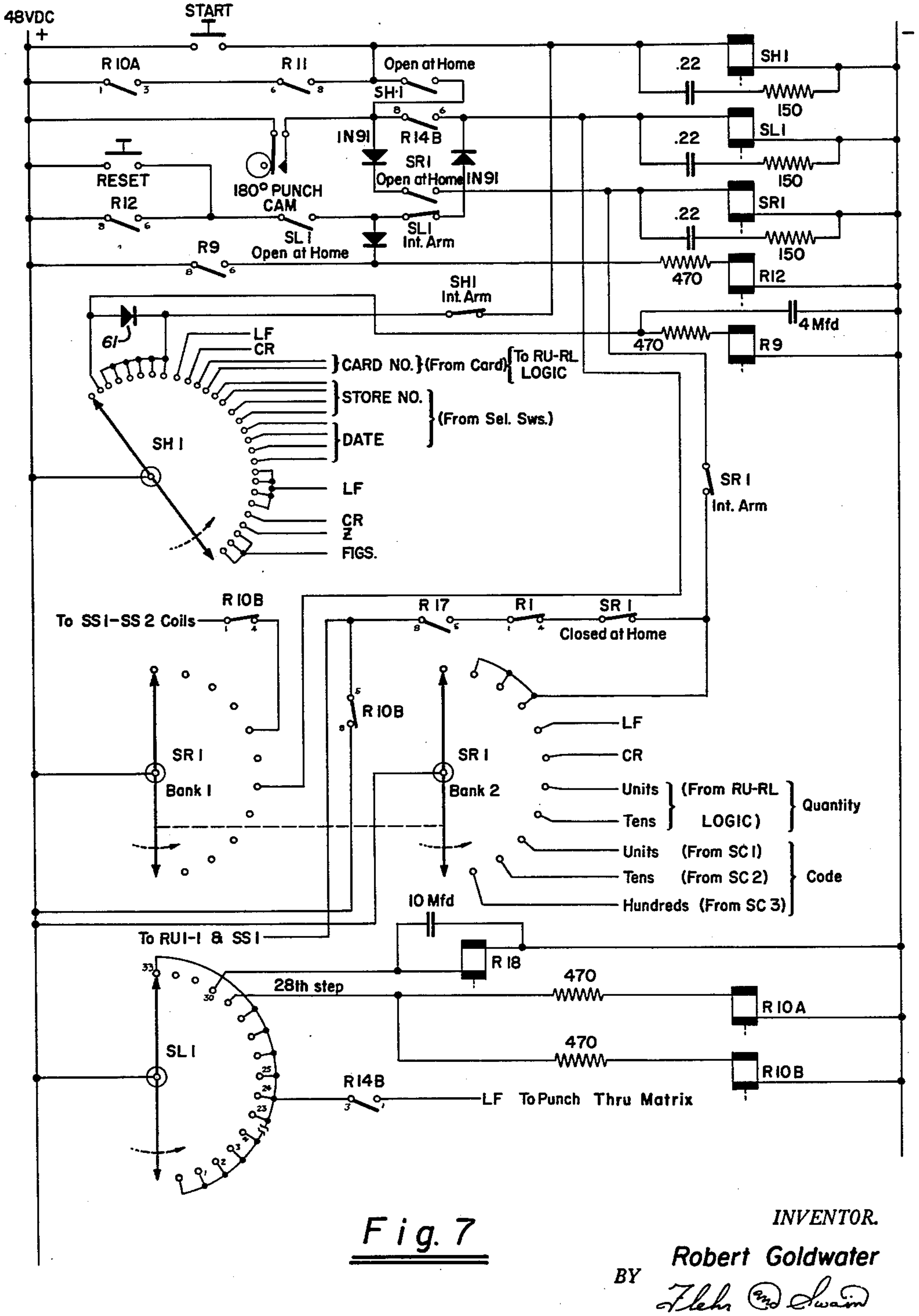
FIGURE 7 is another portion of the circuit diagram of my apparatus showing the heading stepper, the read stepper, and the line stepper with the circuitry connected thereto.

- SS1—Scan stepper No. 1
- SS2—Scan stepper No. 2
- SC1—Count stepper No. 1
- SC2—Count stepper No. 2
- SC3—Count stepper No. 3
- SH1—Heading stepper
- SR1—Read stepper
- SL1—Line stepper In describing the operation of the circuitry in FIGURES 3 through 9, let it be assumed that a plurality of cards have been placed into the card reader unit 21 and that the selector switches representing the date and the store number have been set up in accordance with the card. The selector switches for the date and the store number may be arranged in the same manner as described in copending application Serial No. 653,898, filed April 19, 1957. The selector switches are all identical and are provided with terminals 0–9 and a manually operated wiper for engaging the terminals. Thus, four such selector switches (not shown) are used with two being used for the month and two for the date. Four such switches (not shown) are used for the four digit store number. The wipers of these selector switches are connected to certain terminals of the heading stepper SH1 as shown in FIGURE 7 of the drawings. The terminals of each of the selector switches are connected to the corresponding terminals of the decimal to Baudot matrix 41 shown in FIGURE 9. The other terminals of the heading stepper SH1 are connected to the corresponding terminals of the decimal to Baudot matrix 41 shown in FIGURE 9.

After the cards for a particular store for a certain date have been inserted in the card reader 21 and the selector switches for the store number and date have been set in the correct positions, my conversion and information inserting apparatus can be placed in operation by closing the switch S1 shown in FIGURE 3 and operating the start pushbutton shown in FIGURE 7.

Figure 4:
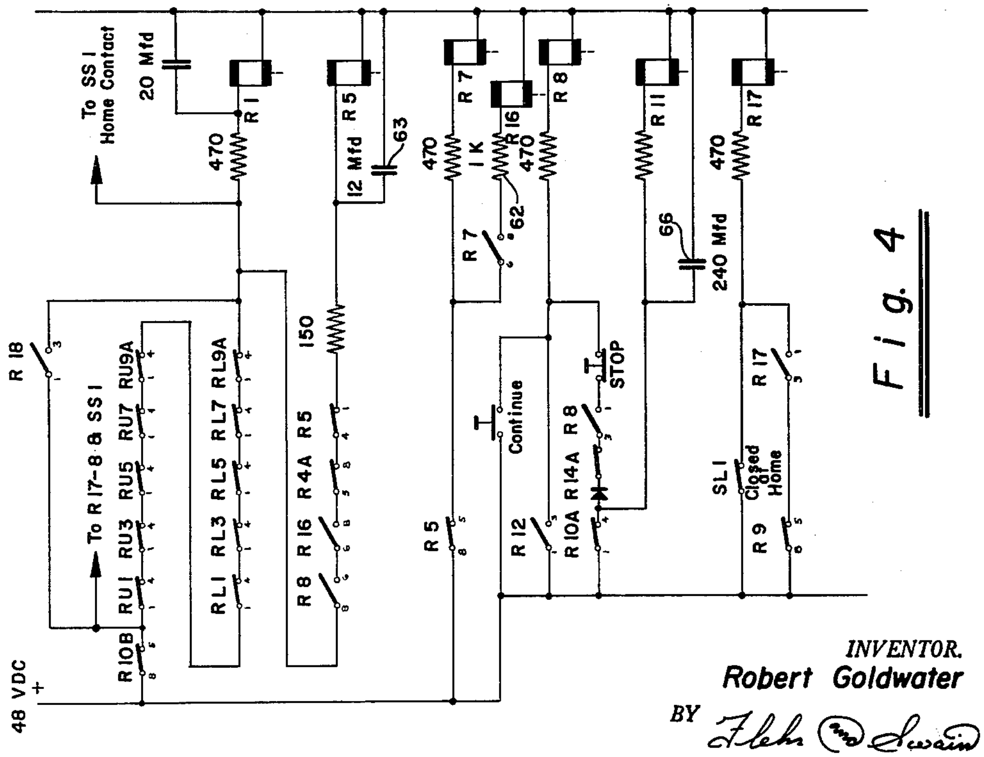
FIGURE 4 is another portion of the circuit diagram of my conversion and information inserting apparatus relating to the clock pulse generator and control circuits.

As soon as power is applied to my apparatus by closing of the switch S1, relay R7 is energized through the normally closed contacts of relay R5 (FIGURE 4). Energization of relay R7 closes its normally open contacts 6 and 8 to energize relay R16. Relay R16 is provided with the resistor 62 which is substantially larger than the resistors utilized in series with the other relays so that the relay R16 will have a fast drop out for a purpose hereinafter described.

Closing of the start pushbutton energizes the coil for the heading stepper SH1 as shown in FIGURE 7 and causes the heading stepper to be advanced to the first terminal upon release of the start pushbutton.

Figure 9:
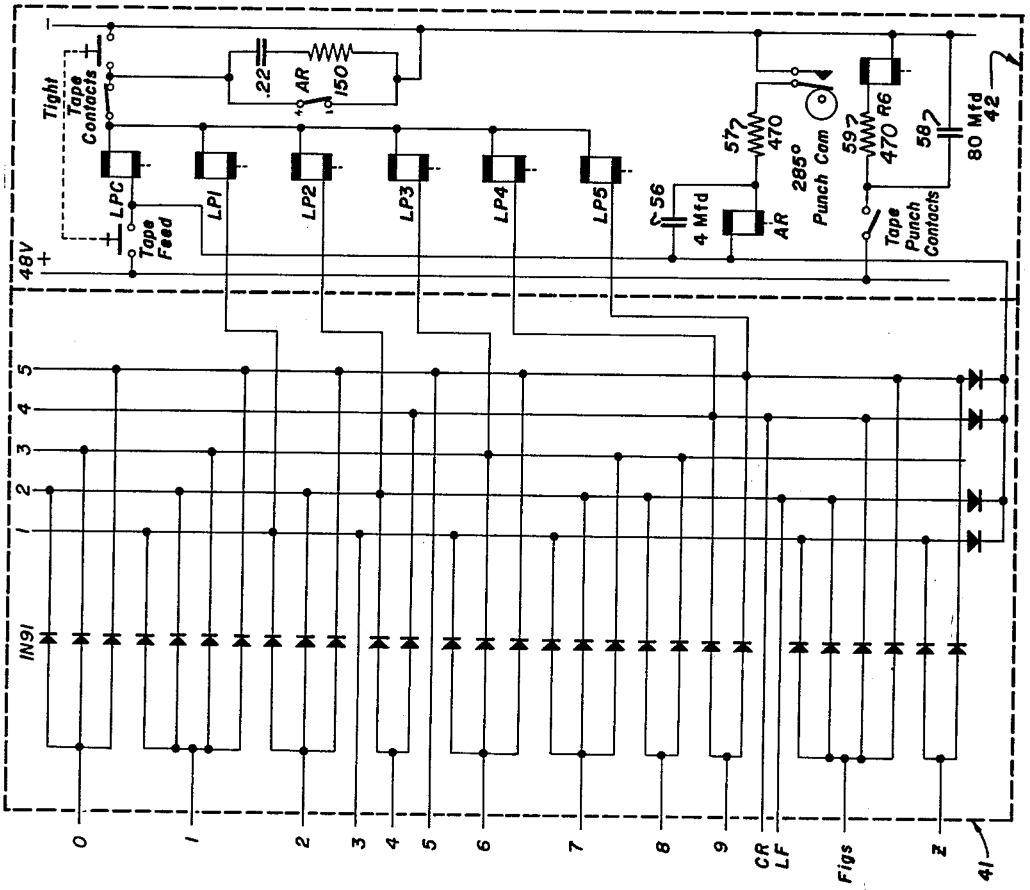
FIGURE 9 is still another portion of the circuit diagram of my apparatus showing the decimal to Baudot code conversion matrix and the punch control circuitry.
Figure 8:
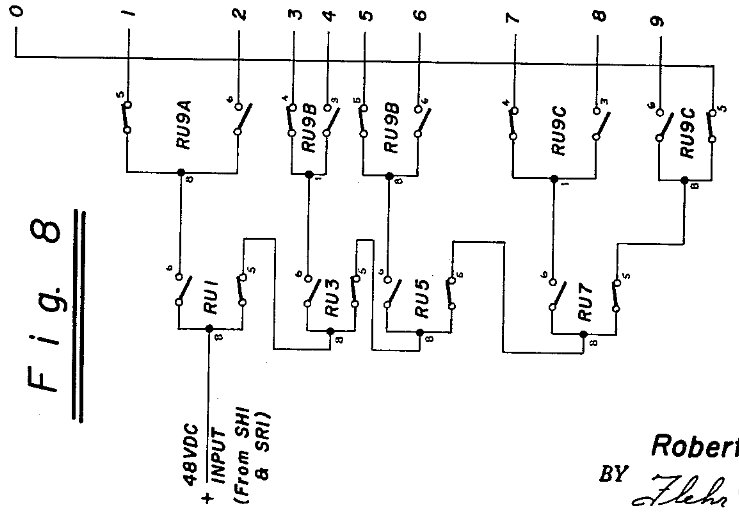
FIGURE 8 is another portion of the circuit diagram of my apparatus showing the conversion matrix for converting from the card code to decimal code.

Advancement of the wiper of the heading stepper SH1 to the first terminal causes a voltage to be applied to the "Figures" lead of the diode matrix shown in FIGURE 9 to energize the punch magnets LP1, LP2, LP4 and LP5 to cause holes to be punched in the paper tape being utilized in the tape punch 42 corresponding to the "Figures" character of the Teletype or Baudot code. The diode matrix and punch control circuitry is substantially identical to that disclosed in copending application Serial No. 653,898, filed April 19, 1957, issued as Patent No. 2,980,758. The circuits through the four punch magnets are completed through the normally closed tight tape contacts, through normally closed contacts 1 and 4 of relay AR to the negative side of the 48 v. power supply.

At the same time that the punch magnets are energized, the solenoid for operating the clutch in the tape punch magnet and identified as LPC in FIGURE 9 is energized. Energization of the LPC solenoid releases the shaft which carries the 180° and 285° cams and causes the punches which have been raised by the associated punch magnets to perforate the tape in the tape punch. The 180° punch cam which is shown in FIGURE 7 and the 285° punch cam which is shown in FIGURE 9 are rotated by the same shaft. As explained in copending application Serial No. 653,898, filed April 19, 1957, issued as Patent No. 2,980,758 and the 180° punch cam is positioned so that the contacts associated with it are closed after approximately 20° of rotation of the shaft utilized for rotating the cam from its home position. Closing of these contacts establishes a circuit for energizing the step coil of the heading stepper SH1 through the normally open at home contacts of SH1 which are now closed because the wiper of the heading stepper SH1 has been moved from its home position.

After the holes have been punched in the tape by rotation of the shaft permitted by energization of the clutch solenoid LPC, the contacts associated with the 285° punch cam are closed to energize the winding for the anti-repeat relay AR. A capacitor 56 is positioned across the anti-repeat relay to ensure that the relay AR will be energized for a sufficient interval of time to permit the deenergization of the clutch solenoid LPC. A resistor 57 in series with the AR relay reduces the voltage to the proper value for the relay. Energization of the AR relay open its normally closed contacts 1 and 4 to deenergize the punch magnets and the clutch solenoid LPC. Deenergization of the clutch solenoids LPC causes the clutch to engage the shaft utilized for rotating the 180° and 285° punch cams and operating the punch dies to prevent its rotation through more than one revolution. Thus, relay AR prevents more than one set of holes being punched in the tape for each set of pulses received by the matrix 41.

As is well known to those skilled in the art, the punch 51 contains additional features. For example, it contains a manually operated double pole tape feed switch (FIGURE 9) which permits the clutch solenoid LPC to be energized to cause tape to be fed out of the tape punch. The punch also contains normally closed tight tape contacts as shown in FIGURE 9 which are opened if the tape becomes too tight to prevent further operation of the punch. It also includes tape punch contacts which are closed each time holes are punched into the tape to energize relay R6. Energization of relay R6 closes its contacts 1 and 3 to energize the rewind reel motor M2 in FIGURE 3. A capacitor 58 across the relay R6 ensures that the relay R6 will be energized for sufficient time to permit energization of the rewind motor M2. A resistor 59 is provided for reducing the voltage to the relay R6 to a suitable value.

From the foregoing, it can be seen that when the wiper of the heading stepper SH1 is advanced to the first terminal, a "Figures" character will be punched into the tape. As pointed out previously, the step coil for the heading stepper SH1 is energized by closing of the contacts associated with the 180° cam. During a certain time during the revolution of the shaft carrying the cams, the contacts are opened. Upon opening of the contacts, the step coil for the heading stepper SH1 is deenergized to cause the wiper of the heading stepper to be advanced to the next terminal. Since this next terminal is also connected to the "Figures" character of the diode matrix 41, another "Figures" character is punched into the tape in the same manner as hereinbefore described. The same sequence of operation occurs and the wiper for the heading stepper SH1 is subsequently advanced to the third terminal which is also connected to the "Figures" character of the diode matrix. Thus, three "Figures" characters are punched into the tape in order to provide a leader on the tape and to condition the Teletype printer to print figures.

Thereafter, the heading stepper SH1 is advanced to the next terminal which is connected to the Z-character of the diode matrix. The Z-character is utilized as a "full trip" signal for the purpose of showing that the following information is new information. This character is punched into the tape and is particularly useful in tape-to-card converters as is well known to those skilled in the art for converting information on tape into information on cards. Thereafter, as can be seen from the terminals of the heading stepper SH1, a "Carriage Return" is punched into the tape; then four "Line Feeds" are punched into the tape. The line feeds are punched into the tape so that when the tape is placed in the tape transmitter 23 and typed out by the page printer 24, suitable spacing will be provided from the top of the page before the heading for the page is started.

The heading is now punched into the tape by the wiper of the heading stepper SH1 advancing through the four terminals associated with the date. The 48 volt D.-C. voltage is applied first to the two month selector switches in sequence to punch the month into the tape, and thereafter the day of the month is punched into the tape by feeding the 48 volt D.-C. through the two selector switches associated with the day. Thereafter, the store number is punched into the tape in the same manner by going through the selector switches associated with the store number and which, as described previously, has been preset for the store number associated with the cards to be scanned.

Thereafter, the heading stepper SH1 is advanced to the two terminals associated with the card number. These two terminals are connected to the contacts in the card reader 21 associated with columns 86 and 87 in which the card number has been recorded. The card hole contacts associated with the columns 86 and 87 are connected through RU-RL relay logic similar to that hereinafter described and shown in FIGURES 5 and 8 and which forms the matrix 43. After conversion from Remington Rand code to decimal by the matrix 43, the card number information is supplied to the decimal to Baudot matrix 41 which supplies it to the tape punch 42 to cause the card number to be punched into the tape.

After the card number has been punched into the tape, the heading stepper SH1 is advanced through succeeding terminals to cause a "Carriage Return" and "Line Feed" to be punched into the tape. Thereafter, the heading stepper SH1 rapidly steps to a home position through a circuit established through contacts operated by the SH1 interrupting arm to repeatedly energize and deenergize the step coil for the heading stepper SH1.

When the wiper of SH1 reaches the last terminal of the heading stepper SH1, relay R9 is energized. A diode 61 is provided to prevent energization of the relay R9 prior to the last stop of the heading stepper SH1. Energization of relay R9 closes its normally open contacts 8 and 6 (FIGURE 7) to complete a circuit for momentary energization of relay R12.

Energization of relay R9 also momentarily drops out relay R17 by opening its contacts 8 and 5 (FIGURE 4) to prevent read stepper SR1 from reading out during the time the line stepper SL1 is homing as hereinafter described.

After relay R9 is operated, the stepping switch SH1 is advanced to its home position shown in FIGURE 1 through its contacts operated by its interrupter arm. Relay R9 is utilized to continue the cycle after the heading readout. Energization of relay R12 closes its normally open contacts 1 and 3 (see FIGURE 4) to energize relay R8 which is hereinafter described as a start-stop relay. Energization of relay R12 establishes a holding circuit for itself through its contacts 6–8 and the SL1 "open at home contacts" (see FIGURE 7). Relay R12 provides a time delay to permit certain things to occur as hereinafter described before relay R8 is energized.

It will be noted that many of the relays are provided with resistors which are in series with the relays. These resistors serve as voltage dropping relays and permit utilization of 24 volt relays on a 48 volt supply. It is readily apparent that, if desired, the resistors could be eliminated by utilizing relays having the same voltage rating as the power supply.

Energization of relay R8 closes its normally open contacts 1 and 3 (FIGURE 4) to establish a holding circuit for relay R8 through the normally closed contacts 1 and 4 of relay R10A, the normally closed contacts 8 and 5 of relay R14A, and the normally closed stop pushbutton (FIGURE 4). When the relay R8 is energized, its normally open contacts 8 and 6 (see FIGURE 4) are closed to establish a circuit for energization of the clock relay R5. It will be noted that the clock relay R5 is energized through a plurality of normally closed relay contacts as shown in FIGURE 4 and through normally open relay contacts 6 and 8 of relay R16 which previously have been closed as hereinbefore described by energization of the relay R16. The relay R5 is provided with a pull in and drop out delay. It is provided with a pull in delay so that the RU and RL relays will have adequate time to operate. The drop out delay is provided by a large capacitor 63 in parallel with the relay R5 and is the time required for the capacitor 63 to discharge below the holding voltage of the relay R5. The drop out delay is provided for the purpose of permitting certain operations as hereinafter described.

As soon as relay R5 is energized, its normally closed contacts 8 and 5 are opened to deenergize the holding circuits for relays R7 and R16. Thereafter, because of the time delay provided by the capacitor 62, the relay R5 is also deenergized because of the opening of contacts 1 and 4 of R5. As soon as relay R5 is deenergized, its contacts 8 and 5 are closed to again establish a circuit for energizing relays R7 and R16 as hereinbefore described. This same sequence of operation continues to thereby provide a continuous free running action in much the same manner as a multivibrator circuit.

I have found it desirable to utilize a plurality of relays for obtaining this multivibrator action rather than a single relay which would be operated by its own contacts in order to obtain a delay in opening as well as a delay in closing. This time delay before energization of the relay R5 is provided to give the normally closed contacts for relays RU1, RU3, RU7 and all of the other normally closed contacts in series with the winding of the relay R5 an opportunity to open before the relay R5 is energized. Thus, as hereinafter described, if any one of the normally closed contacts is open, the clock circuit is stopped because the relay R5 cannot be energized.

Figure 5:
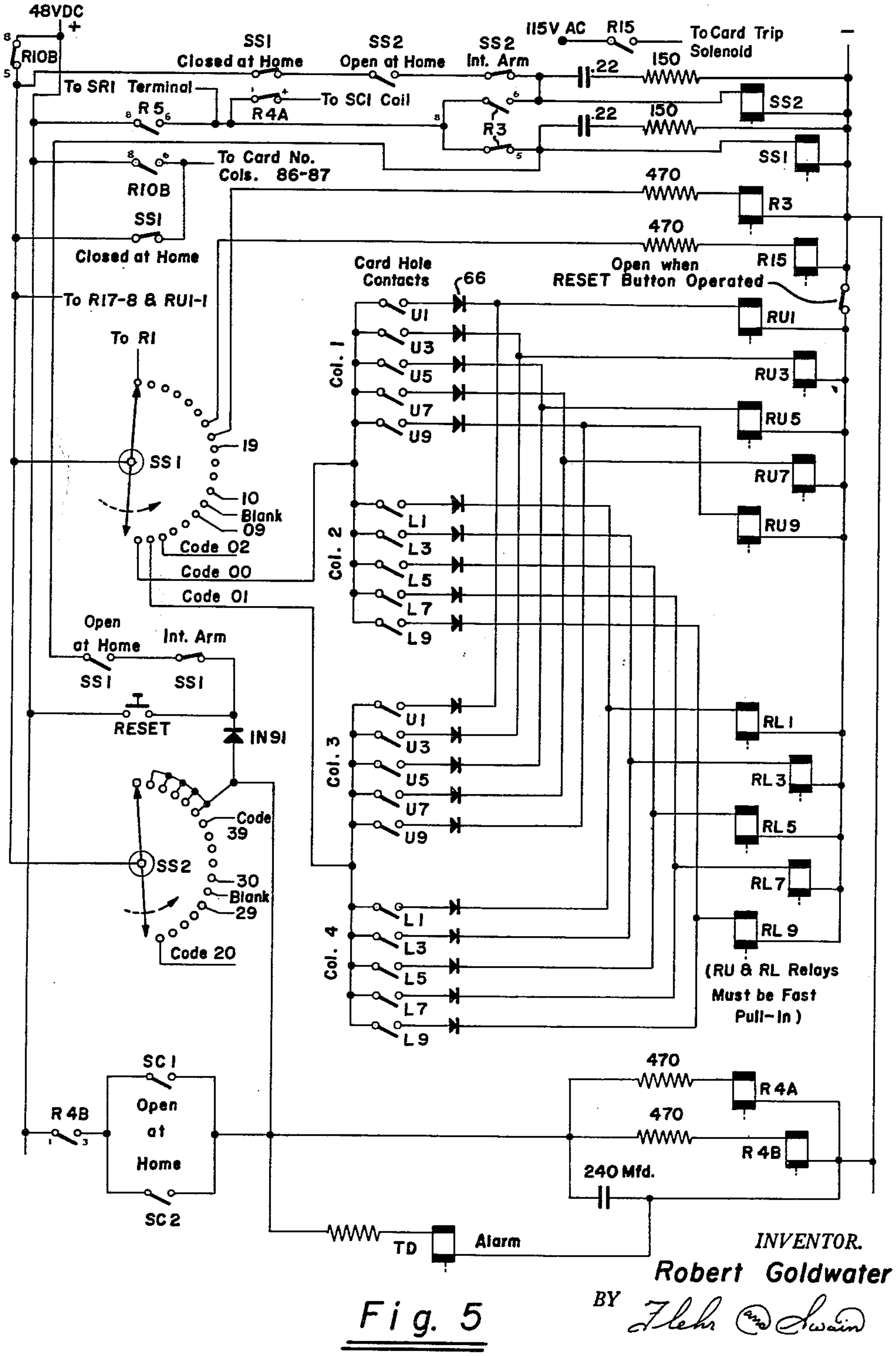
FIGURE 5 is another portion of the circuit diagram of my apparatus particularly showing the scan steppers and the circuitry connected thereto.

In FIGURE 5 it will be noted that the relay R5 is provided with contacts 8 and 6 which are in series with the stepping coils of the scan steppers SS1 and SS2. As hereinafter explained, the scan steppers SS1 and SS2 form the scanning circuit 37 and are utilized for scanning the card and looking for holes in the card. The scan steppers SS1 and SS2 are connected to the plurality of normally open contacts which are a part of the card reader 21. The normally open contacts correspond to actual hole positions in the Remington Rand cards being utilized and are identified as follows: The upper order or high order contacts corresponding to the card holes in column 1 of the card, which in the present embodiment represents the 10's digits of the quantity ordered, are identified as U1, U3, U5, etc., as shown in FIGURE 5. The lower order contacts (units of quantity) associated with the holes in column 2 are identified as L1, L3, L5, etc. The numbers assigned to the upper and lower order of numbers correspond to the actual hole position on the card that is 1, 3, 5, 7 and 9. The upper and lower order contacts for the other columns on the card are identified in the same manner. As will be apparent from FIGURE 5, only four columns of contacts have been shown. However, as is well known to those skilled in the art, there are provided five sets of contacts for each column of the 90 columns provided on each card. The columns, as heretofore explained, have been assigned code numbers. For example, code 00 has been assigned to columns 1 and 2 of the card; code 01 to columns 3 and 4; and so forth.

It can be seen from FIGURE 5 that scan stepper SS1 covers the first 20 code numbers, that is, codes 00 through 19. Thus, the first 21 terminals (one blank) of the scan stepper SS1 cover the first 40 columns of the card. In the same manner, the first 21 terminals of the scan stepper SS2 are connected to a subsequent 40 columns of the card and are identified by the other codes 20 through 39 which are utilized.

As can be seen from FIGURE 5, each of the U and L hole contacts is connected to a diode 66 of a suitable type such as General Electric 1N1692 which serves to prevent feedback between columns and between hole positions. The diode 66, therefore, serves as the feedback prevention system 43 shown in block form in FIGURE 2.

The diodes 86 are connected to the Remington Rand Code to decimal matrix 44. The matrix 44 includes relay RU1, RU3, RU5, RU7, RU9A, RU9B and RU9C which are connected to the upper order card hole contacts U1 to U9 of each code group as shown particularly in FIGURE 5. Thus, relay RU1 is connected to the U1 card hole contacts of each code group. Relay RU3 is connected to the U3 card hole contacts and so forth. Three separate relays RU9A, RU9B and RU9C are connected to the U9 card hole contacts to provide sufficient contacts and to permit utilization of the same relay throughout. If desired, a single relay having sufficient contacts can be used in place of the three RU9 relays.

The matrix 44 also includes relays RL1, RL3, RL5, RL7, RL9A, RL9B, RL9C which are connected to the lower order card hole contacts L1, L3, L5, L7 and L9 of each code column in the same manner as the RU relays hereinbefore described are connected to the upper order contacts. As heretofore explained, only four columns of card hole contacts have been shown. Card hole contacts are provided for all 90 columns on each card and the RU and RL relays are connetced to all of these card hole contacts in the same manner as shown in FIGURE 5.

The RU and RL relays are of a type which have a fast pull-in so that they can be operated within the time occurring between the opening and closing of the relay R5.

From the circuit diagram shown in FIGURE 5, it can be seen that when one or more of the card hole contacts is closed in a particular code group, one or more relays of the RU and RL relays will be energized in accordance with the particular card hole contacts which are closed.

As hereinbefore described, the relay R5 which is part of the clock circuit 36 is periodically operated to close its normally open contacts 8 and 6 (FIGURE 5) to apply 48 volt D.-C. to the step coil of the scan stepper SS1 through normally closed contacts 8 and 5 of relay R3.

After the step scanner SS1 has been advanced step by step to terminal 20 and the card hole contacts associated with columns 00 to 19 have been scanned, the relay R3 is energized to close its normally open contacts 8 and 6 and open its normally closed contacts 8 and 5 to apply clock controlled pulses to the step scanner SS2 to cause it to be advanced step by step in a manner similar to the manner in which step scanner SS1 was advanced. This causes all the holes in the card associated with codes 20 through 39 to be scanned by the scan stepper SS2.

At the same time that the scan steppers SS1 and SS2 are being advanced, the count steppers SC1, SC2 and SC3 which form a part of the counting circuit 38 are being advanced. The contacts 8 and 6 of R5 shown in FIGURE 5 are connected to the step coil for count stepper SC1 as shown in FIGURE 6. The circuit is completed through normally closed contacts 1 and 4 of relay R4A. The count steppers SC1, SC2 and SC3 keep track of where the scanning circuit 37 is with respect to the card. The count stepper SC1 counts the units from 0 to 9; the count stepper SC2 counts the tens from 00 up to 30; and the count stepper SC3 counts the hundreds from 000 up to 900. It will be noted that the count stepper SC1, SC2 and SC3 are each provided with two banks or levels, bank 1 and bank 2. Bank 1 can be identified as the control bank, whereas bank 2 can be identified as a counting bank.

From the circuit shown in FIGURE 6, it can be seen that each time the relay R5 is energized, a pulse is applied to energize the step coil for the count stepper SC1 to advance it step by step. After every ninth step, a circuit is completed through bank 1 of the count stepper SC1 for energizing the step coil for the count stepper SC2. Thus, upon the next energization of the relay R5, the count stepper SC2 will be advanced one terminal. Only three of the terminals are required on the count stepper SC2 for counting because only 39 code group are utilized.

Now, let it be assumed that the card hole contact U1 in column 1 is closed. When the scan stepper SS1 is advanced to the first terminal, the relay RU1 will be energized. Energization of relay RU1 causes opening of its contacts 1 and 4 (see FIGURE 4) to cause deenergization of relay R5. At the same time, relay R1 is also deenergized. Deenergiaziton of relay R5 stops the clock circuit. Deenergization of relay R1 closes its normally closed contacts 1–4 (FIGURE 7) to establish a circuit for energizing the step coil for the read stepper SR1 (FIGURE 7). This circuit is completed through the normally closed contacts 5 and 8 (FIGURE 7) of relay R10B through the normally open contacts 6 and 8 (FIGURE 7) of relay R17 (now energized) and through the SR1 contacts which are closed at home and the normally closed SR1 interrupter arm contacts.

Thus, the read stepper SR1 is advanced to the first terminal. The SR1 "closed at home" contact opens preventing advance at SR1 through its own interrupting arm. SR1 is advanced through the next seven steps by the 180° punch cam through the SR1 "open at home" contact (now closed) in a manner similar to that described for SH1. SR1 will first read the commodity code consisting of the hundreds, tens and units which are taken from the wipers of the count steppers SC3, SC2 and SC1, respectively. It will next read the quantity in tens and units from the RU and RL relay logic network. It then inserts a carriage return and line feed, after which it homes itself through its own interrupting contacts. As soon as the read stepper SR1 has returned to home position, its open at home contacts are opened to stop the operation of the read stepper SR1 at its home position.

It should be pointed out that when the wiper of bank 1 of the read stepper SR1 reaches a position corresponding to the units of the quantity of bank 2 of read stepper SR1, a circuit is completed from the fifth terminal of bank 1 of SR1 to energize the step coil for line stepper SL1 to advance the line stepper SL1 one terminal to indicate that an item has been read out. Also, when the wiper for the bank 1 of read stepper SR1 reaches the seventh terminal, a circuit is completed to the step coils for scan steppers SS1 and SS2 so that the scan stepper being operated will be advanced to the next terminal. As soon as the scan stepper is advanced from the preceding terminal, the relay which previously had been operated of the RU, RL relays will be deenergized to again close the normally closed contacts of the relay RU1 to complete a circuit (see FIGURE 4) the energization of the clock circuit relay R5. The scan stepper will again be advanced until another hole is found, after which the clock circuit is again halted and readout is completed in a manner as hereinbefore described.

In this manner, scan stepper SS1 will scan the 40 sets of contacts connected to its 20 terminals and identified as codes 00 through 19. Thereafter, as hereinbefore described, the scan stepper SS2 will scan the other 40 sets of contacts with its first 21 terminals identified as codes 20 through 39. Each time a hole is found which is designated by a closed contact, the clock circuit is stopped and the read stepper SR1 is placed in operation by energization of the stepping coil for the read stepper SR1. Each time the read stepper completes a cycle of operation, it causes the line stepper SL1 to be advanced one step.

As pointed out previously, when the scan stepper SS1 is advanced to the 22nd terminal, the winding for relay R3 is energized so that the pulses from the clock circuit are applied to the step coil for the scan stepper SS2.

After the scan stepper SS2 has been advanced to the terminal associated with code 39 and upon receipt of the next clock pulse from the clock circuit, the wiper for scan stepper SS2 is advanced to the next terminal which is connected to the step coil for the scan stepper SS1 through the interrupting arm contacts for scan stepper SS1 and through the open at home contacts (now closed) of scan stepper SS1 to energize the step coil for the scan stepper SS1. This causes scan stepper SS1 to be advanced to the next terminal to cause energization of relay R15. Energization of relay R15 causes closing of its normally open contacts (FIGURE 5) to energize the card trip solenoid in the card reader 21 to cause another card to be placed in the card reader so that another scanning operation can thereafter take place.

After energization of relay R15, scan stepper SS1 returns to its home position through action of its interrupting contacts opening and closing the circuit to its step coil through the wiper of SS2. When SS1 reaches its home position, its open at home contacts are opened to stop the wiper for the scan stepper SS1 at the at home position shown in FIGURE 5. In the at home position of scan stepper SS1, relay R1 is energized (FIGURE 5) to prevent a readout while SS2 is homing and while SS1 is at home.

When the scan stepper SS1 arrives at its at home position, its closed at home contacts (FIGURE 5) are closed to complete a circuit for energization of the step coil for scan stepper SS2 through the open at home contacts and the interrupter contacts of scan stepper SS2. Thereafter, the scan stepper SS2 is rapidly returned to its home position by action of its interrupting contacts. Scan stepper SS2 is stopped at its home position shown in FIGURE 5 by the opening of its open at home contacts.

It will be noted that a spark arresting network consisting of a serially connected resistor and capacitor is provided in certain instances as shown in the circuit diagrams, e.g., FIGURE 5, to reduce contact pitting.

Means is provided for manually returning the scan steppers SS1 and SS2 to their home positions and consists of a reset pushbutton shown in FIGURE 5. Operation of the reset pushbutton closes a circuit similar to that closed through the scan stepper SS2.

As soon as the scan steppers SS1 and SS2 are at their home positions, the apparatus is again ready for scanning the next card. The scan steppers SS1 and SS2 go through the same sequence of operation as do the read stepper SR1 and the count steppers SC1, SC2 and SC3. Each time an item is read out, the line stepper SL1 is advanced one line so that the lines are properly counted.

When the line stepper SL1 has counted 28 lines and has been advanced to the 28th terminal, relays R10A and R10B are energized (see FIGURE 7) to deenergize everything in the circuitry which is not required. Energization of relay R10B opens its contacts 8 and 5 (FIGURE 4) to stop the clock circuit. In FIGURE 5, these same contacts 8 and 5 of relay R10B are opened to remove the 48 volt D.-C. power from the scan steppers SS1 and SS2. Energization of relay R10B also closes its normally open contacts 8 and 6 (FIGURE 5). These contacts are closed to cause the energization of the RU and RL relays associated with the contacts corresponding to columns 86 and 87 on the card and which are subsequently utilized for reading off the card number to be read as hereinafter described.

Energization of relay R10A causes closing of its normally open contacts 1 and 3 (FIGURE 7). Energization of relay R10A opens its normally closed contacts 1 and 4 to deenergize relay R11 (FIGURE 4). Deenergization of relay R11 is delayed by capacitor 66 to permit the heading stepper SH1 to be energized before R11 is deenergized. Deenergization of relay R11 opens its contacts 6 and 8. However, before this occurs, the step coil for the heading stepper SH1 is energized to advance the heading stepper upon deenergization of its step coil by opening of contacts 6 and 8 of relay R11.

Energization of the step coil for the heading stepper SH1 causes the figures, Carriage Return and Line Feed characters to be punched into the tape as hereinbefore described. Thereafter, the date, store number and card number are punched into the tape. Then, Carriage Return and Line Feed are punched into the tape in the same manner as hereinbefore described. After this information has been punched into the tape, the heading stepper SH1 homes itself as hereinbefore described and causes energization of relay R9. Energization of relay R9 causes energization of relay R12 through its contacts 8 and 6 (FIGURE 7). Energization of relay R12 energizes relay R8 through closing of its normally open contacts 1 and 3 (FIGURE 4). Energization of relay R8 closes its normally open contacts 8 and 6 to energize the relay R5 to start operation of the clock circuit.

Energization of relay R12 closes its normally open contacts 8 and 6 to complete a circuit to the step coil of the line stepper SL1 through the open at home and interrupting arm contacts of stepper SL1. Thereafter, line stepper SL1 rapidly steps to its home position in a conventional manner. When the line stepper SL1 is advanced one terminal beyond the 28th terminal position, relays R10A and R10B are deenergized. As soon as R10B is deenergized, its normally closed contacts again close to permit subsequent starting of the scanning process.

Also, when the line stepper is advanced one terminal beyond the 28th step position, a relay R18 is energized. Relay R18 is provided with normally open contacts 1 and 3 (FIGURE 4) which are closed to bypass all of the RU and RL contacts shown in FIGURE 4 to maintain relay R1 energized during the time the line stepper SC1 is being returned to home. Relay R18 contacts 1 and 3 also provide a one shot pulse for clock relay R5. This prevents false readout and prevents repeating the last entry on the preceding page as the first entry on the succeeding page.

I have hereinbefore described one condition where it is required to enter a new heading on the top of the page, that is, when a page has been completely filled by 28 entries. There is, however, another condition in which a new page is required. When all of the coded commodities under one warehouse number have been scanned or, in other words, when the last coded commodities, i.e. code 39 for the tenth card, i.e. the 900's group, a new page is required. Thus, when the count stepper SC3 reaches the 900's position, relay R13 is energized by bank 1 of the count stepper SC3. However, it is not desired to do anything until the count actually reaches 939 plus one. When the scan stepper SS2 passes code 39 by one terminal, it steps into a position in which it energizes relays R4A and R4B. Energization of relay R4B closes its normally open contacts 8 and 6 (FIGURE 6) which are in series with the normally open contacts of relay R13. Since relay R13 is already energized, relays R14A and R14B are energized. A holding circuit is established for relays R14A and A14B through the closing of the contacts 1 and 3 of relay R14A. At this time, relays R9 and R10A are deenergized so that the normally closed contacts 1 and 4 of relay R9, and 5 and 8 of relay R10A are closed for completion of the holding circuit. Thus, it can be seen that when the relays R14A and R14B are energized, they represent the number 939 plus one. Energization of relay R14B closes its normally open contacts 1 and 3 (FIGURE 7) which are connected between the Line Feed terminal of the decimal to Baudot matric 41 and the terminals of the line stepper SL1. Thus, when the last warehouse number has been reached, line feeds are continuously punched into the tape because the relay R14B is also provided with normally open contacts 8 and 6 which close the circuit across the 180° punch cam for the tape punch to cause the step coil for the line stepper SL1 to be energized each time a line feed is punched into the tape. Thus, the line stepper SL1 is advanced step by step.

When the line stepper SL1 reaches the 28th step, the relays R10A and R10B are energized to cause the same sequence of operations as hereinbefore described. The energization of relay R10A opens its normally closed contacts 5 and 8 to open the holding circuit for relays R14A and R14B.

The count steppers SC1, SC2 and SC3 are returned to their home positions by operation of the associated pushbuttons at the end of each complete order. The homing circuits are established through the open at home contacts and interrupting contacts in a conventional manner. The relays R4A and R4B are deenergized when the open at home contacts (see FIGURE 5) for SC1 and SC2 are opened. If they do not both open, relays R4A and R4B are not deenergized and another scanning operation can not be commenced. Also, an alarm TD is activated after a predetermined interval of time.

Thereafter, a new heading is punched into the tape and the cards for the next order are processed by operating the start pushbutton.

It is apparent from the foregoing that I have provided a new and improved card to tape converter which is relatively simple in its operation. It is constructed from standard components available on the market which makes my card to tape converter relatively inexpensive. It is apparent that, if desired, the stepping switches can be eliminated and relay sequence circuits substituted therefor.

It is also apparent from the foregoing that with my conversion and information inserting apparatus that a tape is produced which can be utilized for readily producing a conventional Teletype page which can be produced by a conventional Teletype printer. The date, store number and card number are repeated at the top of each page.

It is apparent from the foregoing that although I have discussed my conversion and information inserting apparatus for use in stores for ordering commodities from warehouses, my conversion and information inserting apparatus is readily adaptable to other types of uses as, for example, any situation in which it is desired to convert information on cards onto tape and at the same time to insert additional information on the tape.

I claim:

1. In a converting and information inserting apparatus for converting information on cards in the form of holes arranged in columns onto a punches tape, a card reader, the card reader having a plurality of sets of contacts positioned in accordance with the number of possible holes in the cards, each set of contacts assuming one condition when there is a hole in the card corresponding to the position of the contacts and another condition when there is no hole, means for scanning the contacts associated with the holes in the cards to ascertain the condition of the contacts and thereby the information contained on the cards, means for converting the scanned information into the decimal system, means for scanning the contacts to determine the columnar position of all holes in each card and supplying it as decimal information, means converting the decimal information into information in the Baudot system, and means for punching the Baudot information into the tape so that the tape carries the information placed on the cards as well as the columnar positions of the information on the cards.

2. In a converting and information inserting apparatus for converting information on cards in the form of holes arranged in a card code in columns into information punched onto a tape, a card reader, the card reader having a plurality of rows of contacts positioned so that one set of contacts is associated with each possible hole in the card, each set of contacts assuming one condition when there is a hole and another condition when there is no hole, a clock circuit, a scanning circuit connected to the clock circuit and to the card reader, a relay matrix connected to the contacts in the card reader for converting the card code information into decimal information, an additional matrix connected to the first named matrix converting decimal information into a Baudot code, a power supply, the scanning circuit applying a voltage from the power supply to the rows of contacts in sequence in the card reader to thereby cause energization of the relays in the first named relay matrix, a readout scanner, means connected to the relays in the first named relay matrix for stopping the operation of the clock circuit and starting operation of the readout scanner when one or more holes are found in a column of the card, means connected to the readout scanner for ascertaining the columnar position of the holes in the card and supplying the information to the decimal to Baudot matrix, means operated by the readout scanner for taking the card information in the first named relay matrix and supplying it to the decimal to Baudot matrix so that information is inserted on the tape, and means connected to the decimal to Baudot matrix for punching the information supplied to the decimal to Baudot matrix into the tape.

3. Apparatus as in claim 2 together with means for supplying heading information to the decimal to Baudot matrix so that the heading information is inserted onto the tape.

4. Apparatus as in claim 3 wherein each card is provided with a number of identifying the card and wherein the heading means includes means for identifying the number of the card and supplying this information to the decimal to Baudot matrix.

5. Apparatus as in claim 2 together with means for counting the entries into the tape and for stopping the clock circuit at the end of the last entry for a page and means connected to the entry counting means for supplying information to the decimal to Baudot matrix to cause end of page information to be punched into the tape.

6. Apparatus as in claim 2 together with means for ascertaining when the last item of a number of items has been scanned on the cards and for causing end of page information to be supplied to the decimal to Baudot matrix when the last item has been scanned.

7. In a converting and information inserting apparatus for converting information punched in a card code as holes in columns on cards into information on a punched tape, a card reader adapted to receive the cards one by one and having a plurality of rows contacts in alignment with the card columns, one set of contacts being associated with each possible hole in the card, each pair of columns in the card being assigned a code designation, a power supply, scan selector switch means connected to the power supply and selecting pairs of columns in sequence, a matrix for converting card code information into decimal information connected to the contacts in the card reader and comprising a plurality of relays connected to the contacts in the card reader, clock means for causing sequential operation of the scan selector switch means to apply a voltage to pairs of rows of contacts in sequence to thereby cause energization of relays in the matrix, at least one counting means operated by the clock circuit in synchronism with the scan selector switch means, a readout scanner connected to the scan selector means and means operated by one or more relays in the matrix for stopping the clock circuit when one or more holes are found in a column of the card, the readout scanner means being operated when said clock circuit is stopped, a decimal to Baudot matrix connected to the first named matrix and to the counting means, the readout scanner being operated so that the columnar position of the holes in the card is first supplied to the decimal to Baudot matrix from the counting means and thereafter the card information is supplied to the decimal to Baudot matrix, and means for punching into tape the information supplied to the decimal to Baudot matrix.

8. Apparatus as in claim 7 together with heading means to cause heading information to be supplied to the decimal to Baudot matrix.

9. Apparatus as in claim 7 together with a line counting means for counting the number of entries supplied to the decimal to Baudot matrix and means for causing end of page information to be supplied to the decimal to Baudot matrix after a predetermined number of entries have been supplied to the decimal to Baudot matrix.

10. Apparatus as in claim 9 together with means for causing end-of-the-page information to be supplied to the decimal to Baudot matrix at the end of a series of related cards.

11. Apparatus as in claim 7 together with means for ascertaining the card number of each card and supplying such information to the decimal to Baudot matrix.

12. Apparatus as in claim 7 wherein said clock circuit is comprised of at least two relays and wherein said clock circuit is periodically turned on and off.

13. Apparatus as in claim 7 together with means to cause heading information to be supplied to the decimal to Baudot matrix at the beginning of each page so that pages may be separated and each individual page will contain complete information regarding its origin and contents.

14. In apparatus of the character described for converting information on cards in the form of holes arranged in columns on the cards and placing it on a record medium, a card reader, the card reader having a plurality of sets of contacts positioned in accordance with the number of possible holes in the cards, each set of contacts assuming one condition when there is a hole in the card corresponding to the position of the contacts and another condition when there is no hole, means for scanning the contacts associated with the holes in the cards to determine which of said sets of contacts are in said one condition, means controlled by the scanning means for ascertaining the columnar position of each of said sets of contacts in said one condition, and means controlled by the scanning means for placing on the record medium information associated with and relative to the columnar position of each of said sets of contacts in said one condition and for placing on said record medium additional information associated with the position of each of said sets of contacts in said one condition in the columns.

15. In apparatus of the character described for recording information on a record medium, a plurality of cards having indicia thereon arranged in columns, means for scanning the cards sequentially one at a time to locate indicia placed on the cards, means controlled by the scanning means for determining the columnar position of any indicia located on the card being scanned, and means controlled by the scanning means for placing on the record medium information associated with and relative to the columnar positions of the indicia located on the card and information associated with the positions of the located indicia in the columns.

16. In apparatus of the character described for recording information on a record medium, a plurality of cards having indicia thereon arranged in columnar form, means for scanning the columns of a single card at a time to locate any indicia placed on the card, means controlled by the scanning means for determining the columnar positions of any indicia located on the card, and means controlled by the scannnig means for placing data on the record medium corresponding to the columnar positions of the indicia on the card and for placing data on the record medium corresponding to the positions of the indicia in the columns.

17. In apparatus of the character described for recording information on a record medium, a plurality of cards having indicia arranged in columns thereon, a card reader, the card reader having a plurality of elements arranged in columns and positioned in accordance with the possible number of indicating indicia on the cards, each of the elements assuming one condition when there is an indicating indicium on the card corresponding to the position of the element and another position when there is no indicating indicium corresponding to the position of the element, means for scanning the elements associated with the indiciating indicia on the cards to ascertain the conditions of the elements, means controlled by the scanning means for determining the columnar position of any element located in said one condition, means controlled by said means for locating the columnar position of any elements in said one condition for recording on said record medium data associated with and relative to the columnar positions of said elements in said one condition and data associated with the positions of said elements in said one condition in said columns.

References Cited in the file of this patent

UNITED STATES PATENTS

| | | |
|---|---|---|
| 2,377,766 | Doty | June 5, 1945 |
| 2,742,966 | Thomas et al. | Apr. 24, 1956 |

FOREIGN PATENTS

| | | |
|---|---|---|
| 830,371 | Great Britain | Mar. 16, 1960 |